3,132,030
METHOD OF CANNING RICE
Norman S. Verity, Montreal, Quebec, and Russell C. Allen, Mount Royal, Quebec, Canada, assignors to Mount Royal Rice Mills Limited, Montreal, Quebec, Canada
No Drawing. Filed June 25, 1962, Ser. No. 205,061
6 Claims. (Cl. 99—186)

This invention relates to food processing, and is particularly concerned with a method of canning rice.

Prior to the present invention, the canning of pre-cooked rice has not been successful due to the tendency of the rice to solidify or gelatinize to some degree, such that when the cans were opened it was difficult to get the rice out. The rice formed a relatively solid body and in the normal course could only be removed by spooning it out with attendant difficulties. Alternatively, both ends of the cans were removed and the body of rice was pushed through, and subsequently crumbled.

As a result of the above noted difficulty, the canned rice products heretofore provided have not been readily accepted by the consumer and it has been recognized that canned rice could not be sold extensively unless this difficulty could be overcome to the point wherein the rice flows easily from the can when the latter is opened.

It is, therefore, an object of this invention to provide a method of canning rice which will produce a final product which will pour easily from the can.

It is a more specific object of the invention to provide a method of canning rice which includes the step of freezing the can following the canning operation, which step prevents the rice from solidifying within the can, thereby producing a final product which pours readily when the can is opened.

As indicated above, it is the step of freezing the rice after canning which prevents the rice from solidifying or gelatinizing within the can and forming a solid body. It is believed that when the product is not frozen, the excess starch forms a glue-like material which prevents the rice from being fluid. Freezing apparently breaks down this excess starch and the glue-like material is not formed whereby the rice pours easily when the can is opened.

In developing the method of canning rice in accord with the invention, many experiments were carried out to determine if the tendency of the rice to cake in the can could be avoided by leaving a fair amount of head space whereby to allow the rice to expand. It was thought that the former methods of canning rice might have failed due to the expansion of the rice during the retorting process, thereby causing the rice grains to be forced together. It was thought that by providing sufficient head space, the rice grains would not be forced together but would be allowed to expand to fill the head space. However, it was found that the provided head space was not a sufficient measure and the post-canning freezing step is essential.

The canning method in accord with the invention is adaptable to processing both parboiled and regular rice. The term regular rice refers to rice which is subjected to the standard milling processes of hulling and polishing following harvesting. Parboiled rice is rice which is treated prior to the standard milling process by being steeped in water, parboiled in steam and dried. Although the present process can be used to can both regular and parboiled rice, a superior final product is obtained when the parboiled variety is used as the canned parboiled rice not only flows more freely but it is a much better looking product, stands up better in soups and casseroles, and has better keeping quality for any unused portion of rice after it has been taken out of the can.

In order to further illustrate the details of the present canning method, several examples thereof are hereafter described.

*Example I*

Parboiled rice is soaked in water with a temperature of 75° F. to 80° F. and pH 6.5 for 60 minutes. The same water is then brought to 212° F. and the rice cooked 8 minutes; then drained 10.9 oz. of the cooked rice is then packed in a 15 oz. can, using a vacuum packing process at 21 inches mercury. The can is sealed. The can is then placed in a retort and brought up to 212° F. for 3 minutes; held at 212° F. for 10 minutes; brought up to 250° F. in ten minutes, and held at 250° F. for 50 minutes.

The can is then air cooled at room temperature and frozen overnight at 10° F. It is then allowed to thaw at room temperature and the process is completed.

When the can is opened, there is about ⅓ inch head space, a small amount of free water and the rice is highly fluid and pours easily from the can.

A variation on the above method, wherein the can is water cooled after retorting instead of being air cooled, produces a small amount of caking on the bottom of the can, but the rice can still be described as being quite fluid and the object of the invention is achieved. Another variation wherein the rice is packed in the can without vacuum will also produce a final product which will pour easily, although a small amount of caking in the bottom does occur. However, rice packed without vacuum sours and spoils quickly.

*Example II*

Parboiled rice is soaked in water with a temperature of 70° F. and pH 6.5 for 30 minutes. The rice is then drained and placed in fresh boiling water at pH 6.5. It is then cooked in this fresh water at 212° F. for 8 minutes and drained again. Subsequently, the rice is handled in accord with Example I, except that the vacuum packing process is carried out at 26 to 28 inches mercury.

*Example III*

Regular rice is soaked in water with temperatures of 75° F.–80° F. and pH of 6.5 for 45 minutes. The same water is brought up to 212° F. and the rice cooked 45 minutes; then drain. Again, 10.9 oz. are vacuum packed in a 15 oz. can. The can is then retorted, frozen and thawed in accord with Example I On opening the can, the rice is found to be of fairly good colour and free of water but somewhat caked, although capable of easy removal. This condition is contrasted with the completely caked and glue-like consistency of the rice which is not frozen following canning.

*Example IV*

Parboiled rice is prepared in accord with Example I with the one difference that only 8.9 ozs. are packed in the 15 oz. can whereby to achieve a final headspace of ¾" to 1". The fluidity of the final product is not as good as the smaller head space in accord with Examples I and II, but the rice can be readily removed from the can.

The above examples of the canning method in accord with the invention specifically refer to a freezing operation carried out overnight at 10° F. In this regard, it will be appreciated that such freezing operation can be varied without departing from the scope of the invention. The important consideration is that the contents of the can must be frozen regardless as to how the freezing is accomplished.

What we claim as our invention is:

1. A method of canning rice whereby to produce a product which will pour easily from the can, said method comprising the steps of soaking and cooking the rice in water, canning, subjecting the sealed can to retorting for a predetermined period of time, cooling the can, freezing the contents of said cooled can and thawing the frozen contents.

2. A method of canning parboiled rice comprising the steps of soaking the rice in water at a temperature of between 70° F. and 80° F. for approximately 60 minutes, bringing the water to a boil and cooking the rice at full boil for approximately 8 minutes, draining and then vacuum canning the rice, subjecting the sealed can to retorting for approximately 60 minutes at temperatures up to but not exceeding approximately 250° F., cooling the can to room temperature, freezing the contents of said cooled can and thawing said frozen contents.

3. A method as claimed in claim 2, in which the freezing step is carried out at 10° F.

4. A method of canning parboiled rice so as to produce a final product which will flow readily from the can when the latter is opened, comprising the steps of soaking the rice in water at a temperature of between 75° F. and 80° F. and pH of 6.5 for approximately 60 minutes, bringing the water to a boil and cooking the rice at boiling temperature for approximately 8 minutes and draining, placing a quantity of the soaked and cooked rice in a can leaving a head space in the order of ¼ inch, vacuum canning using a vacuum in the order of 21 inches mercury, placing the can in a retort, raising the temperature within the retort up to 212° F. over a period of approximately 3 minutes, holding the temperature in the retort at 212° F. for approximately 10 minutes, and finally holding the temperature within the retort at 250° F. for approximately 50 minutes, removing the can from the retort and cooling same to room temperature in air, freezing the contents of said cooled can at a temperature of about 10° F. and thawing the frozen contents.

5. A method of canning parboiled rice comprising the steps of soaking the rice in water at a temperature of approximately 70° F. for approximately 30 minutes, draining, placing the rice in fresh boiling water and cooking at 212° F. for approximately 8 minutes, draining again and then vacuum canning the rice using a vacuum pressure of from 26 to 28 inches mercury, subjecting the sealed can to retorting for approximately 60 minutes at temperatures up to but not exceeding approximately 250° F., cooling the can to room temperature, freezing the contents of said cooled can and thawing said frozen contents.

6. A method of canning regular rice comprising the steps of soaking the rice in water, bringing the water to a boil and cooking the rice at full boil for approximately 4½ minutes, draining and vacuum canning the rice, subjecting the sealed can to retorting for a predetermined period of time, cooling the can, freezing the contents of said cooled can at a temperature of about 10° F. and thawing the frozen contents.

References Cited in the file of this patent

UNITED STATES PATENTS

| | | |
|---|---|---|
| 2,161,119 | Coan | June 6, 1939 |
| 2,686,130 | Roberts | Aug. 10, 1954 |
| 3,030,214 | Miller | Apr. 17, 1962 |

OTHER REFERENCES

Boggs et al.: "Food Technology," February 1952, pages 53 and 54, 99–193.

"Food Technology," 1958, vol. XII, No. 9, pages 464–468, 99–193.

(Copies in Scientific Library.)